United States Patent
Edpalm et al.

(10) Patent No.: US 11,722,697 B2
(45) Date of Patent: Aug. 8, 2023

(54) METHOD AND DIGITAL VIDEO CAMERA FOR FORMING A COMBINED IMAGE FRAME OF A COMBINED VIDEO STREAM

(71) Applicant: Axis AB, Lund (SE)

(72) Inventors: Viktor Edpalm, Lund (SE); Alexander Toresson, Lund (SE); Johan Palmaeus, Lund (SE); Jonas Cremon, Lund (SE)

(73) Assignee: Axis AB, Lund (SE)

( * ) Notice: Subject to any disclaimer, the term of this patent is extended or adjusted under 35 U.S.C. 154(b) by 71 days.

(21) Appl. No.: 17/530,739

(22) Filed: Nov. 19, 2021

(65) Prior Publication Data

US 2022/0201330 A1 Jun. 23, 2022

(30) Foreign Application Priority Data

Dec. 17, 2020 (EP) .................................. 20215063

(51) Int. Cl.
*H04N 19/70* (2014.01)
*H04N 19/176* (2014.01)
(Continued)

(52) U.S. Cl.
CPC ............ *H04N 19/597* (2014.11); *H04N 5/04* (2013.01); *H04N 19/105* (2014.11); *H04N 19/172* (2014.11); *H04N 19/88* (2014.11)

(58) Field of Classification Search
CPC .. H04N 7/181; H04N 21/816; H04N 21/2343; H04N 21/2365; H04N 7/152; H04N 19/176
See application file for complete search history.

(56) References Cited

U.S. PATENT DOCUMENTS

| 9,077,578 B1 | 7/2015 | Kizhepat et al. |
| 2014/0050267 A1* | 2/2014 | Sakurai ................. H04N 19/46 375/240.18 |

(Continued)

FOREIGN PATENT DOCUMENTS

| EP | 2462540 A1 | 6/2012 |
| EP | 3618442 A1 | 3/2020 |

(Continued)

OTHER PUBLICATIONS

Extended European Search Report dated Jun. 1, 2021 for European Patent Application No. 20215063.7.

(Continued)

*Primary Examiner* — Luis Perez-Fuentes
(74) *Attorney, Agent, or Firm* — Volpe Koenig

(57) ABSTRACT

A method for forming a combined image frame of a combined video stream comprises: capturing image frames of first and second video streams; encoding image data of the image frames of the first and second video streams, wherein each image frame of the first and second video streams are respectively encoded into first and second encoded data comprising a plurality of rows wherein each row has a height of a single coding unit and a width equal to a width of the image frame and is encoded as one or more slices; and combining the first and second encoded data into combined encoded data by interleaving rows of the first and second encoded data. The combined encoded data representing the combined image frame of the combined video stream.

13 Claims, 4 Drawing Sheets

(51) Int. Cl.
*H04N 19/597* (2014.01)
*H04N 19/105* (2014.01)
*H04N 19/172* (2014.01)
*H04N 19/88* (2014.01)
*H04N 5/04* (2006.01)

(56) References Cited

U.S. PATENT DOCUMENTS

| | | | | |
|---|---|---|---|---|
| 2014/0140391 | A1* | 5/2014 | Eshima | H04N 19/85 375/240.01 |
| 2014/0253806 | A1* | 9/2014 | Yano | H04N 21/8451 348/598 |
| 2015/0208037 | A1* | 7/2015 | Maurice | H04L 65/70 348/14.09 |
| 2019/0158859 | A1 | 5/2019 | Zhang et al. | |

FOREIGN PATENT DOCUMENTS

| | | |
|---|---|---|
| EP | 3668096 A1 | 6/2020 |
| WO | 01/20386 A2 | 3/2001 |
| WO | 01/56292 A1 | 8/2001 |
| WO | 2011/017336 A1 | 2/2011 |

OTHER PUBLICATIONS

Vetro, Anthony. "Representation and Coding Formats for Stereo and Multiview Video." Intelligent Multimedia Communication (2010).
Wenger et al., "RTP payload Format for H.264 Video; draft-ietf-avt-rtph264-02.txt", RTP Payload Format for H.264 Video; DRAFT-IETFAVT-RTP-H264-02.TXT, Internet Engineering Task Force, IETF; Standardworkingdraft, Internet Society (ISOC) 4, Rue Des Falaises CH—1205 Geneva, Switzerland, vol. avt, No. 2, Jun. 1, 2003 (Jun. 1, 2003).
Communication pursuant to Article 94(3) EPC dated Apr. 11, 2023 for European Patent Application No. 20215063.7.

* cited by examiner

METHOD AND DIGITAL VIDEO CAMERA FOR FORMING A COMBINED IMAGE FRAME OF A COMBINED VIDEO STREAM

FIELD OF INVENTION

The present invention relates to formation of a combined image frame of a combined video stream.

TECHNICAL BACKGROUND

In recent years the numbers of monitoring cameras, e.g., network camera monitoring systems, have increased. Many monitoring cameras use a plurality of image sensors for capturing images of a scene, to cover a larger area of a scene and/or to capture more details of the scene. Due to the high amount of image data in the video stream produced by each image sensor the image data from each image sensor is typically handled separately on a separate video processing circuit. Each such video processing circuit comprises e.g. an encoder for separately encoding the respective video stream captured by each of the image sensors. Hence, separate video streams from the different image sensors are produced.

There is hence a need for being able to produce a combined video stream from the separate video streams. The combined video stream should be decodable by a standard decoder. An example of production of such a combined video stream is disclosed in EP18190932 by Axis AB, however, the solution disclosed in EP18190932 may encounter problems using e.g. the H.264 and MJPEG codecs. Hence, an alternative way of producing a combined video stream from separate video streams is needed.

SUMMARY

In view of the above, overcoming or at least mitigating the problems discussed above would be beneficial. In particular, the concept of slices in, e.g., H.264 encoding to produce a single encoded image stream from a plurality of image streams captured by a plurality of image sensors would be an advancement over current solutions.

According to a first aspect, a digital video camera is provided. The digital video camera comprising: a first image sensor configured to capture image frames of a first video stream; a second image sensor configured to capture image frames of a second video stream; a first encoder configured to encode image data of the image frames of the first video stream, wherein each image frame of the first video stream is encoded into first encoded data comprising a plurality of rows wherein each row has a height of a single coding unit and a width equal to a width of the image frame and is encoded as one or more slices; a second encoder configured to encode image data of the image frames of the second video stream, wherein each image frame of the second video stream is encoded into second encoded data comprising a plurality of rows wherein each row has a height of a single coding unit and a width equal to a width of the image frame and is encoded as one or more slices; and a data combining unit configured to combine first encoded data of an image frame of the first video stream and second encoded data of an image frame of the second video stream into combined encoded data by interleaving rows of the first encoded data of the image frame of the first video stream and rows of the second encoded data of the image frame of the second video stream, the combined encoded data representing a combined image frame of a combined video stream.

A decoder is configured to decode and display a video stream. However, for interoperability reasons, it is generally not possible for the decoder to read information from two different sources and present it as a single video stream. The decoder is set to follow a raster scan, wherein data is read row-by-row following a Z-pattern. The disclosed digital video camera presents a solution wherein each image frame (from one image sensor) is encoded by a separate encoder. Each encoder is configured to encode a respective image frame in rows, wherein each row is one coding block high and has a width of the image frame. Each row is encoded as one or more slices. That is, a single row may contain one or more slices. Following the encoding by the separate encoders, the encoded data from the separate encoders is combined in an interleaved manner forming combined image frames. Hence, the encoded data from the separate encoders is shuffled such that the decoder will see the information as rows from a single combined image frame. Such combined image frames may be decoded and displayed by the decoder. Hence, the disclosed digital video camera allows for producing a combined video stream out of separate video streams being captured by separate image sensors and being processed by separate video processing circuits, each video processing circuit comprising an encoder. Especially, encoding (and subsequent decoding) according to the codec H.264 or MJPEG may be implanted. It is however understood that other encoding codecs may be used. Some non-limiting examples are, H.265, H.266, EVE, VP9 or AV1. The disclosed digital video camera is utilizing the concept of slicing in the encoding. Each encoder is configured to slice the respective video stream to an extreme amount, the slices are set to have a height of only one coding unit.

A row in the combined encoded data may comprise a single row of the first encoded data and a single row of the second encoded data.

The first and second encoders may be configured to encode image data of the first and second video streams in parallel. By parallel is meant that the first and second encoders may work simultaneously on different data.

The first and second images sensors may be configured to capture the first and second video streams synchronously.

The combined image frame may represent a panoramic image.

The data combining unit may be configured to output the combined encoded data as a single bit stream.

The first and second encoders may be configured to encode image data of the first and second image frames such that each row comprises a plurality of slices, wherein each slice has a height of one single coding unit.

The first and second encoders may be configured to encode image data of the first and second image frames such that each row constitutes a single slice. Such encoding may reduce the amount of meta data of the combined image frames, which may decrease the video size. This since, the number of slice header may be reduced.

The data combining unit may be configured to check if two or more directly subsequent slices in the combined encoded data comprises only skip encoded coding units. If so, the data combining unit may be configured to replace the two or more directly subsequent slices comprising only skip encoded coding units with a new slice comprising skip encoded coding units and having a length of the two or more directly subsequent slices comprising only skip encoded coding units. Such replacing of subsequent slices comprising only skip encoded coding units may reduce the amount of meta data of the combined image frames, which may decrease the video size. This since, the number of slice header may be reduced.

According to a second aspect, a method for forming a combined image frame of a combined video stream is provided. The method comprising: capturing, by a first image sensor of a multi-sensor camera, image frames of a first video stream; capturing, by a second image sensor of the multi-sensor camera, image frames of a second video stream; encoding, by a first encoder of the multi-sensor camera, image data of the image frames of the first video stream, wherein each image frame of the first video stream is encoded into first encoded data comprising a plurality of rows wherein each row has a height of a single coding unit and a width equal to a width of the image frame and is encoded as one or more slices; encoding, by a second encoder of the multi-sensor camera, image data of the image frames of the second video stream, wherein each image frame of the second video stream is encoded into second encoded data comprising a plurality of rows wherein each row has a height of a single coding unit and a width equal to a width of the image frame and is encoded as one or more slices; combining, by a data combining unit, the first encoded data of an image frame of the first video stream and second encoded data of an image frame of the second video stream into combined encoded data by interleaving rows of the first encoded data of the image frame of the first video stream and rows of the second encoded data of the image frame of the second video stream, the combined encoded data representing the combined image frame of the combined video stream.

The combining may be made such that a row in the combined encoded data comprises a single row of the first encoded data and a single row of the second encoded data.

The encoding of the image data of the first video stream and the image data of the second video stream may be performed in parallel.

The capturing of the first and second video streams may be performed synchronously.

The method may further comprise checking if two or more directly subsequent slices in the combined encoded data comprises only skip encoded coding units, and if so replacing the two or more directly subsequent slices comprising only skip encoded coding units with a new skip slice comprising skip encoded coding units and having a length of the two or more directly subsequent slices comprising only skip encoded coding units.

In addition, the above-mentioned features of the digital video camera, when applicable, apply to this second aspect as well. In order to avoid undue repetition, reference is made to the above.

According to a third aspect a non-transitory computer-readable storage medium is provided. The non-transitory computer-readable storage medium having stored thereon instructions for implementing the method according to the second aspect, when executed on a device having processing capabilities.

A further scope of applicability of the present concepts will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that is the concepts are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present concepts will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present concepts will now be described more fully hereinafter with reference to the accompanying drawings, in which currently preferred embodiments are shown. This concepts may, however, be embodied in many different forms and should not be construed as limited to the embodiments set forth herein; rather, these embodiments are provided for thoroughness and completeness, and to fully convey the scope of the claims to the skilled person.

In video encoding methods, e.g., Motion JPEG (MJPEG), Advanced Video Coding (AVC) (also called H.264), and High Efficiency Video Coding (HEVC) (also called H.265) the concept of slices has been introduced. Slices allow for the image to be divided into separate regions that can be independently decoded/encoded. The separate regions may be a grid of rectangular regions. To be independently codable, there shall not be any predictions using pixels from more than one slice, and the results from the prediction shall only be used in the same slice. This concept may be used for parallel processing purposes. This concept may also be used as described herein for achieving a single encoded image in an image capturing device comprising a plurality of image sensors and a plurality of encoders, i.e., stitching image data encoded by a plurality of encoders into one encoded image.

Figure 1:
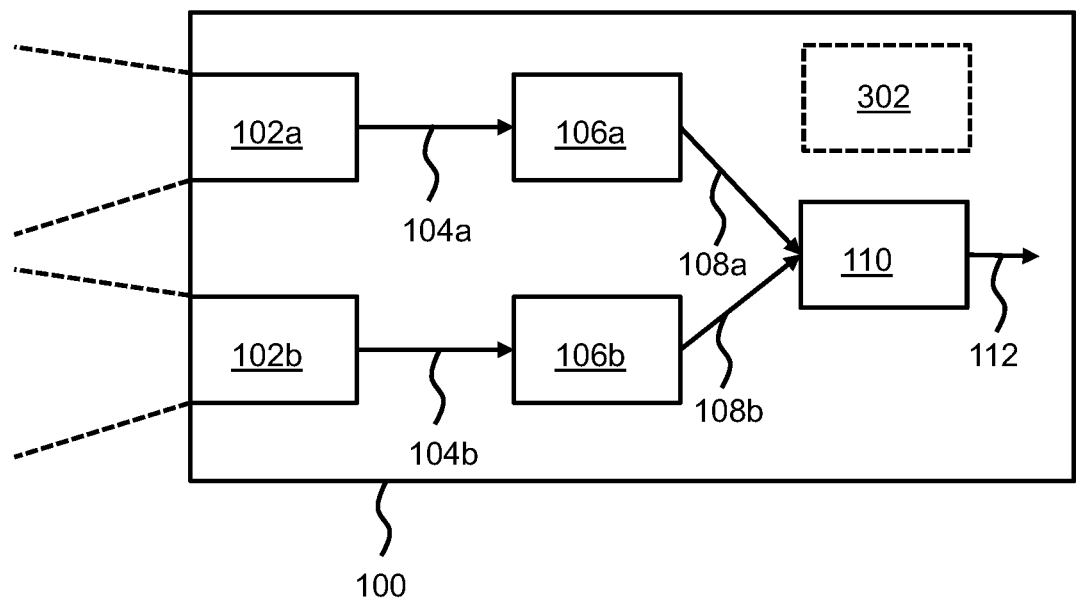
FIG. 1 illustrate a digital video camera configured to generate a combined video stream.

FIG. 1 illustrates digital video camera 100 implementing this concept. The digital video camera 100 comprises a first images sensor 102a and a second image sensor 102b. It is however, realized that the digital video camera 100 may comprise more than two image sensors 102. Each image sensor 102 is configured to capture image frames of a respective video stream. The respective video stream is depicting a respective scene. The image sensors 102 may be configured to capture different parts of a same scene. Hence, upon stitching the video streams captured by the first and second image sensors 102a-b a panoramic video stream may be formed. This is indicated in FIG. 1. Accordingly, the image sensors 102 may be directed in a same direction from the digital video camera 100. It should be noted that any kind of image sensors 102 may be used for the purposes described herein, for example an image sensor 102 employing visual light or infrared (IR) light, a thermal sensor, a Time of Flight (ToF) sensor, etc.

The first and second image sensors 102a-b may be configured to capture the first and second video streams synchronously. That is, the first and second image sensors 102a-b may be configured to capture the first and second video streams at substantially the same time. According to one example, images frames are to be captures synchronously such that a moving object being partly depicted in an image frame captured by the first image sensor 102a and partly depicted in an image frame captured by the first image sensor 102b is correctly depicted. Hence, a pair of image frames, wherein a first image frame in the pair of image frames originates from the first video stream and a second image frame in the pair of image frames originates from the second video stream may be captured synchronously, i.e. at substantially the same time.

The digital video camera 100 may comprise a time controller 302 in communication with the image sensors 102. The time controller 302 is configured to synchronize image capturing settings between the image sensors 102. For example, the time controller 302 may be configured to synchronize a moment in time when the above discussed pair of images frames is captured.

The first image sensor 102a is associated with a first encoder 106a. The first encoder 106a is configured to receive image data 104a of image frames of the first video stream captured by the first image sensor 102a. The first encoder 106a is configured to encode each image frame of the first video stream into first encoded data. Differently expressed, the first encoder 106a is configured to encode image data 104a captured by the first image sensor 102a. The first encoder 106a is configured encode each image frame of the first video stream such that the first encoded data comprises a plurality of rows. The first encoder 106a is set to encode such that each row has a height of a single coding unit and a width equal to a width of the image frames of the first video stream. The coding unit may e.g. be a macroblock or a coding tree block. A size of the coding unit may depend on the encoding codec used. In case of H.264 coding units of a size of 16×16 pixels may be used. In case of MJPEG coding units of a size of 8×8 pixels may be used. In case of H.265 a size of the coding unit is flexible, but e.g. 32×32 pixels or 64×64 pixels may be used. In case of H.266 or AV1 a size of the coding unit is flexible, but e.g. 128×126 pixels or 256×256 pixels may be used. Each row is encoded as one or more slices. Each row may constitute a single slice. Hence, each row may be a slice. Alternatively, each row may comprise a plurality of slices.

The second image sensor 102b is associated with a second encoder 106b. The second encoder 106b is configured to receive image data 104b of image frames of the second video stream captured by the second image sensor 102b. The second encoder 106b is configured to encode each image frame of the second video stream into second encoded data. Differently expressed, the second encoder 106b is configured to encode image data 104b captured by the second image sensor 102b. The second encoder 106b is configured encode each image frame of the second video stream such that the second encoded data comprises a plurality of rows. The second encoder 106b is set to encode such that each row has a height of a single coding unit and a width equal to a width of the image frames of the second video stream. The coding unit may e.g., be a macroblock or a coding tree block. A size of the coding unit may depend on the encoding codec used. In case of H.264 coding units of a size of 16×16 pixels may be used. In case of MJPEG coding units of a size of 8×8 pixels may be used. In case of H.265 a size of the coding unit is flexible, but e.g., 32×32 pixels or 64×64 pixels may be used. In case of H.266 or AV1 a size of the coding unit is flexible, but e.g., 128×126 pixels or 256×256 pixels may be used. Each row is encoded as one or more slices. Each row may constitute a single slice. Hence, each row may be a slice. Alternatively, each row may comprise a plurality of slices.

The first and second encoders 106a-b are configured to encode using a same size of coding unit. Hence, both the first encoder 106a and the second encoder 106b may be configured to encode using macroblocks of size 16×16 pixels, or any other suitable size of coding units.

The first and second encoders 106a-b may be configured to encode image data 104a-b of the first and second video streams synchronously, i.e., at substantially the same time. Differently expressed, the first and second encoders 106a-b may be configured to operate in parallel. Further, the first and second encoders 106a-b may be configured to operate independently of each other. This since the first encoder 106a is configured to encode image data 104a of the first video stream and the second encoder 106b is configured to encode image data 104b of the second video stream.

The first encoder 106a may be hardware or software implemented or even a combination thereof. The first encoder 106a may at least in part be implemented as hardware circuitry comprising logical hardware circuit components. The first encoder 106a may at least in part be software implemented as program code being run on a processor.

The second encoder 106b may be hardware or software implemented or even a combination thereof. The second encoder 106b may at least in part be implemented as hardware circuitry comprising logical hardware circuit components. The second encoder 106b may at least in part be software implemented as program code being run on a processor.

The digital video camera 100 further comprises a data combining unit 110. The data combining unit 110 is configured to receive first encoded data 108a encoded by the first encoder 106a and second encoded data 108b encoded by the second encoder 106b. The data combining unit 110 is further configured to combine the first and second encoded data 108a-b for a pair of the first and second video streams. Preferably, the image frames of the pair of the first and second video streams have been synchronously captured, i.e., the image frames of the pair of image frames have been captured at substantially the same time. The data combining unit 110 is configured to combine the first and second encoded data 108a-b into combined encoded data 112. The combined encoded data 112 representing a combined image frame of a combined video stream. Hence, the data combining unit 110 is configured to stitch the first and second image stream into the combined video stream, the combined video stream being an encoded combined video stream. The encoded combined video stream may represent a panoramic video stream.

The data combining unit 110 may be hardware or software implemented or even a combination thereof. The data combining unit 110 may at least in part be implemented as hardware circuitry comprising logical hardware circuit components. The data combining unit 110 may at least in part be software implemented as program code being run on a processor.

Figure 2:
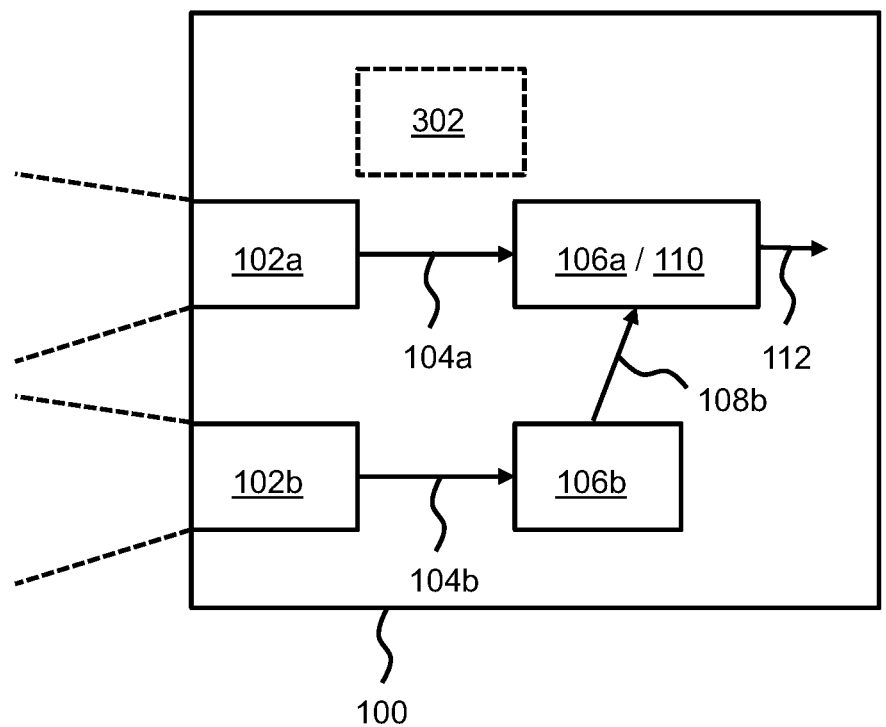
FIG. 2 illustrate an alternative digital video camera configured to generate a combined video stream.

The data combining unit 110 may as illustrated in FIG. 1 be implemented in a for the purpose dedicated unit. Alternatively, the data combining unit 110 may, as illustrated in FIG. 2 be implemented in the first encoder 106a. Hence, the first encoder 106a may be a master encoder, and the second encoder 106b may be a slave encoder.

The data combining unit 110 is configured to combine the first and second encoded data 108a-b into combined encoded data 112 by interleaving rows of the first encoded data 108a of an image frame of the first video stream and rows of the second encoded data 108b of an image frame of the second video stream. This will be discussed in more detail below in connection with FIG. 3.

Figure 3:
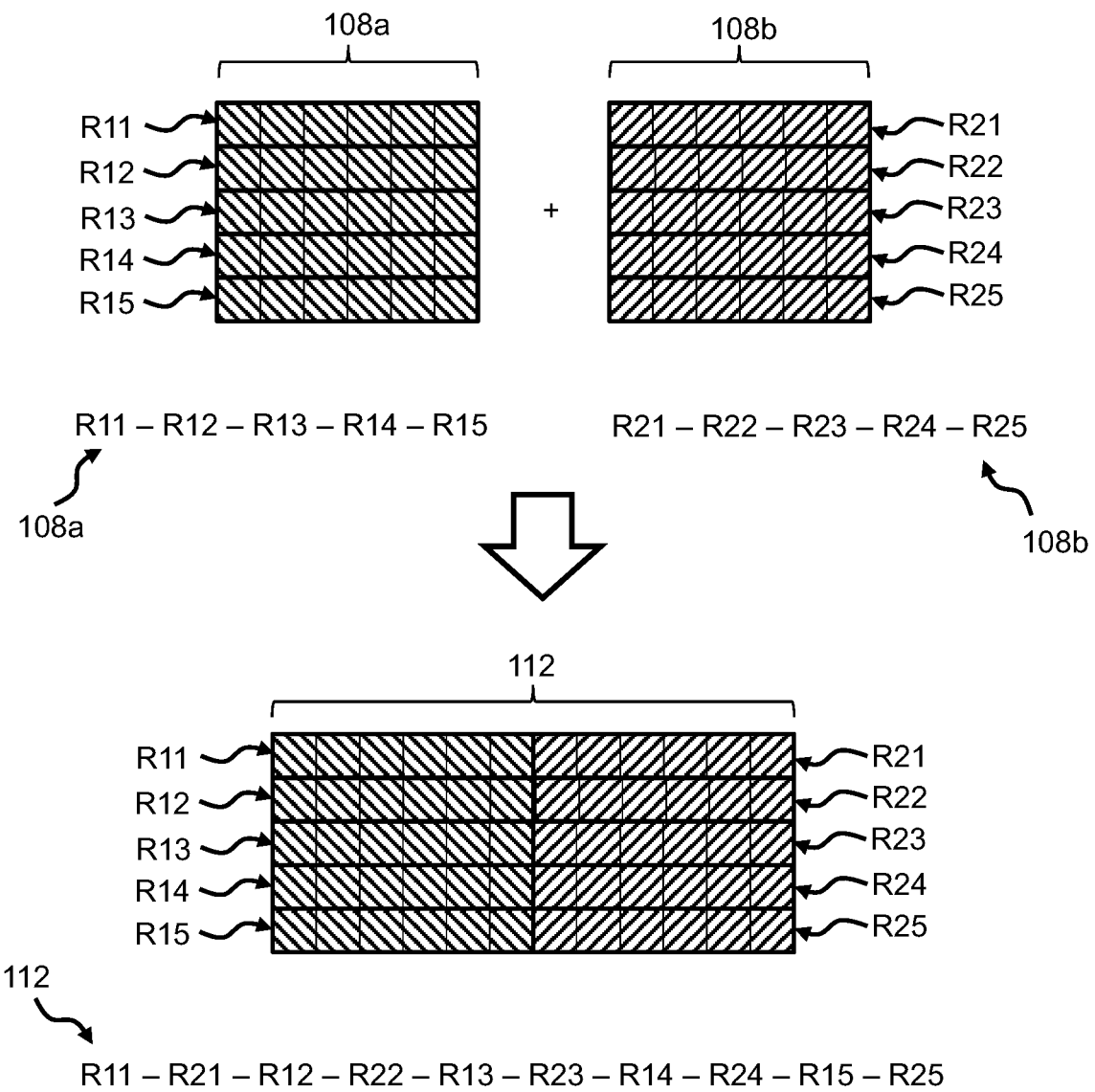
FIG. 3 illustrate a concept of combining first and second encoded data into combined encoded data by interleaving rows of first encoded data of an image frame of a first video stream and rows of second encoded data of an image frame of a second video stream.

In the upper portion of FIG. 3 representations of the first and second encoded data 108a-b are illustrated. Both an image frame representation and a bit stream representation are illustrated. An image frame representation of first encoded data 108a representing an image frame of the first image stream encoded by the first encoder 106a is illustrated to the left and an image frame representation of second encoded data 108b representing an image frame of the second image stream encoded by the second encoder 106b is illustrated to the right. The first encoded data 108a comprises a plurality of rows R11-R15. The second encoded data 108b comprises a plurality of rows R21-R25. Each row R11-R15, R21-R25 has a height of a single coding unit and a width equal to a width of the respective image frame. The width of the image frames of the first video stream and the width of the image frames of the second video stream may be equal, this is the case illustrated in FIG. 3. However, it is to be understood that the width of the image frames of the first video stream may be different from the width of the image frames of the second video stream. The coding unit may e.g., be a macroblock. The coding unit may have a size of 16×16 pixels. As in the in FIG. 3 illustrated example, each row may constitute a single slice. Hence, each row may be a slice. Alternatively, each row may comprise a plurality of slices. However, the plurality of slices of one row are to be treated as a row of the respective encoded image frame.

Directly below the image frame representation of the first encoded data 108a a representation of the first encoded data 108a in the form of a bit stream is illustrated. In the bit stream illustration, the rows R11-R15 of the first encoded data is arranged one after the other. Directly below the image frame representation of the second encoded data 108b a representation of the second encoded data 108b in the form of a bit stream is illustrated. In the bit stream illustration, the rows R21-R25 of the second encoded data is arranged one after the other.

As mentioned above, the data combining unit 110 is configured to combine the first and second encoded data 108a-b into combined encoded data 112. Representations of the combined encoded data 112 are illustrated in the lower portion of FIG. 3. Both an image frame representation and a bit stream representation are illustrated. As can be seen in the image frame representation of the combined encoded data 112 each row of the combined encoded data 112 comprises a single row of the first encoded data and a single row of the second encoded data. This is due to that the data combining unit 110 is configured to form the combined encoded data 112 by interleaving rows of the first encoded data 108a stream and rows of the second encoded data 108b. Hence, as can be seen in the bit stream representation of the combined encoded data 112 a row from the first encoded data is followed by a row of the second encoded data.

Accordingly, the data combining unit 110 is configured to combine first encoded data 108a in the form of a bit stream received from the first encoder 106a and second encoded data 108b in the form of a bit stream received from the second encoder 106b into combined encoded data 112 represented as a single bit stream.

The data combining unit 110 may further be configured to modify metadata of the combined encoded data 112. Especially, so that it is registered in the metadata of the combined encoded data 112 that a width of an image frame represented by the combined encoded data 112 has the combined width of an image frame of the first video stream and an image frame of the second video stream. The metadata may e.g., be a header of the combined encoded data 112.

The data combining unit 110 may further be configured to modify metadata of the slices of the combined encoded data 112. Especially, so that it is registered in the metadata of the respective slice in the combined encoded data 112 a start position of the slice in the combined encoded data 112. The start position of the respective slice may e.g., be given in number of coding units.

The data combining unit 110 may further be configured to insert restart markers at the end of a row R11-R15 of the first encoded data. This is especially needed in case the encoding is made in accordance with the MJPEG codec. This in order to indicated that the MJPEG image frame does not stop at the end of the row R11-R15 of the first encoded data.

Figure 4:
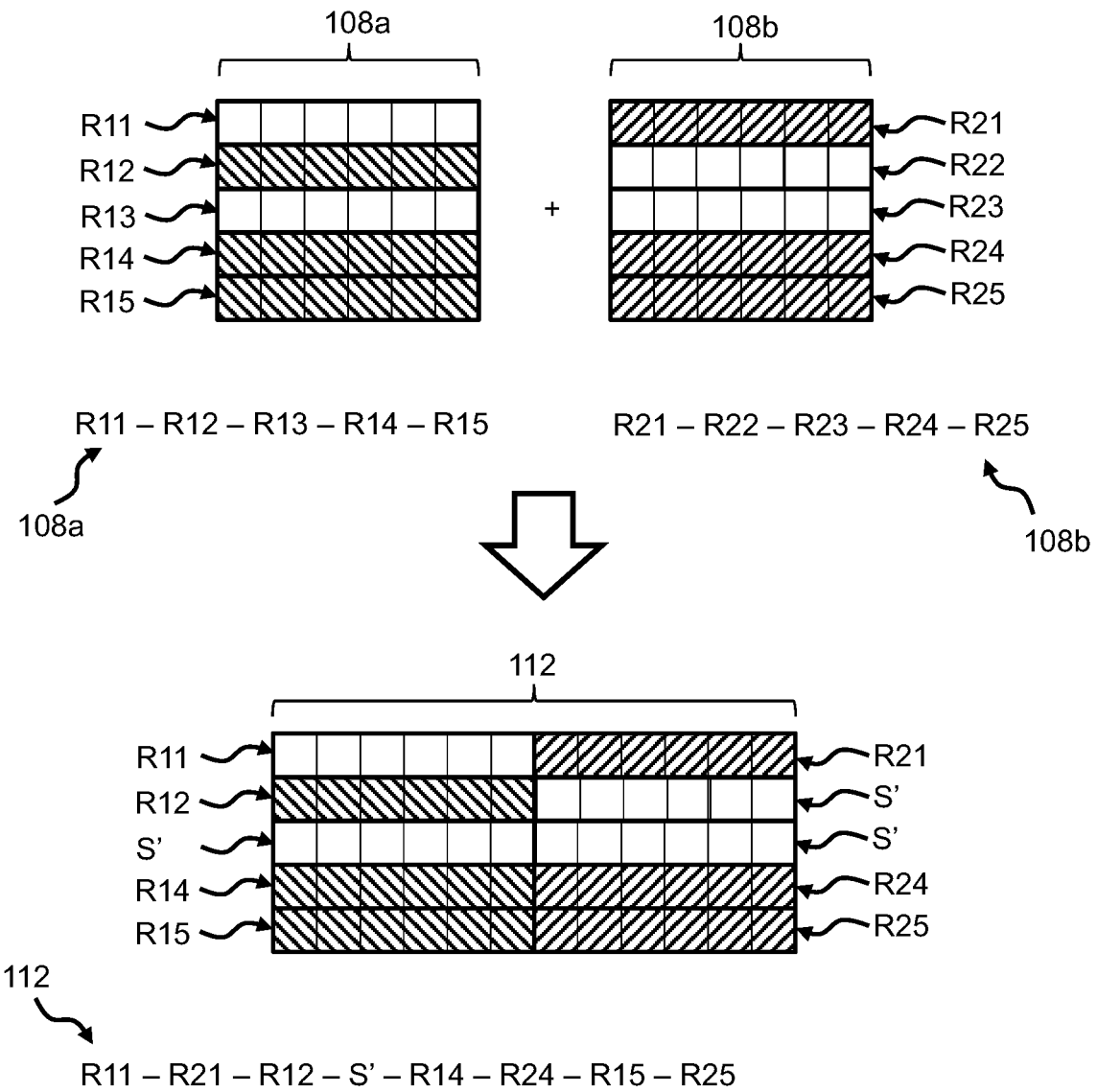
FIG. 4 illustrate a concept of replacing two or more directly subsequent slices in the combined encoded data of FIG. 3 comprising only skip encoded coding units with a new slice comprising skip encoded coding units and having a length of the two or more directly subsequent skip comprising only skip encoded coding units.

As will be discussed in in connection with FIG. 4 the data combining unit 110 may further be configured to check if two or more directly subsequent slices in the combined encoded data 112 comprises only skip encoded coding units. Such a slice will below be referred to as a skip encoded slice. A check if a slice in the combined encoded data 112 comprises only skip encoded coding units may be made in different ways. For example, a size of the slice may be checked and compared with a threshold size. If the size of the slice is below the threshold size the slice may be considered to be a skip encoded slice. According to another example, metadata comprising information pertaining to that the slice only comprises skip encoded coding units may be read. According to yet an alternative, the slice may be compared with a known skip encoded slice. If two or more directly subsequent slices in the combined encoded data 112 comprises only skip encoded coding units, the data combining unit 110 is configured to replace the two or more directly subsequent skip encoded slices with a new skip encoded slice. The new skip encoded slice comprising only skip encoded coding units. The new skip encoded slice having a length of the two or more directly subsequent skip encoded slices. Assume that in the in FIG. 4 illustrated example each row R11-15, R21-R25 of the first and second encoded data 108a-b is a single slice. The top most row R11 and the third row R13 of the first encoded data 108a are skip encoded slices. Further, the second row R22 and the third row R23 of the second encoded data 108b are skip encoded slices. Then in the combined encoded data the three directly subsequent skip encoded slices R22, R13 and R23 may be replaced by a new skip encoded slice S'. This new skip encoded slice having a length of the combined lengths of R22, R13 and R23. By in this manner reducing the number of skip encoded slices by means of combination the number of slice headers may be reduced. Consequently, a file size of the combined encoded data 112 may be reduced. Skip encoded slices comprises substantially no data except for the header.

Figure 5:
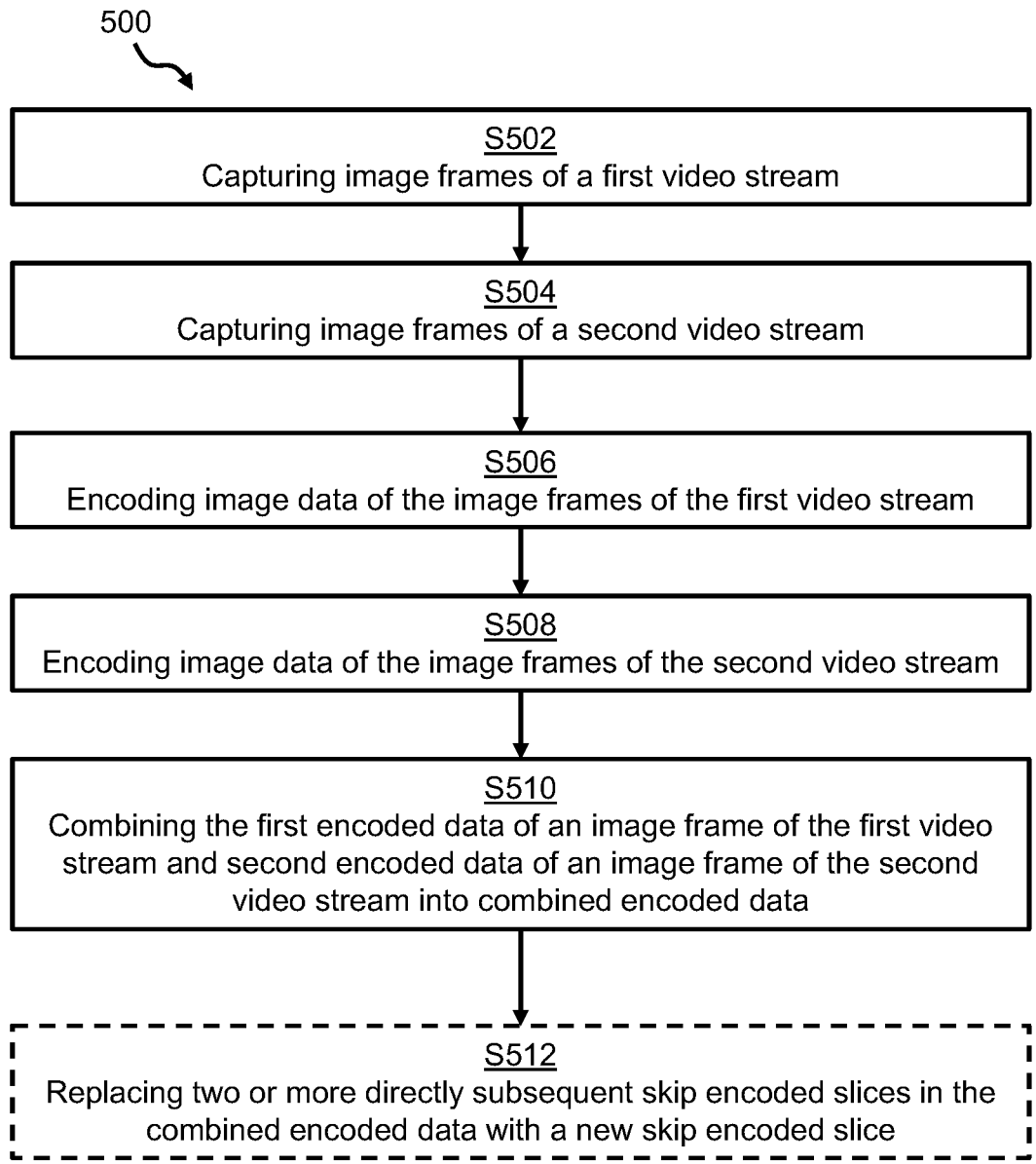
FIG. 5 is a block scheme of a method for forming a combined image frame of a combined video stream.

In connection with FIG. 5 a method 500 for forming a combined image frame of a combined video stream will be discussed. Some of all the steps of the method 500 may be performed by the digital video camera 100, the digital video camera 100 may also be referred to as a multi-sensor video camera, this since the digital video camera 100 comprises two or more image sensors. However, it is equally realized that some of the steps of the method 500 may be performed at another device. The method 500 comprises the following steps. The steps may be performed in any suitable order.

Capturing S502 image frames of a first video stream. The image frames of the first video stream being captured by a first image sensor 102a of the digital video camera 100.

Capturing S504 image frames of a second video stream. The image frames of the second video stream being captured by a second image sensor 102b of the digital video camera 100.

The capturing S502, S504 of the image frames of the first and second video streams may be synchronized. Hence, the capturing S502, S504 of the image frames of the first and second video streams may be synchronized, i.e. the capturing S502, S504 may be made at substantially the same time. The first and second video streams may depict different portions of a common scene. Hence, after stitching the first and second video streams into a combined video stream a panoramic video stream may be formed.

Encoding S506 image data of the image frames of the first video stream. The encoding S506 being performed by the first encoder 106a discussed above. Each image frame of the first video stream is encoded into first encoded data comprising a plurality of rows. Each row has a height of a single coding unit and a width equal to a width of the image frame. Further, each row is encoded as one or more slices.

Encoding S508 image data of the image frames of the second video stream. The encoding S508 being performed by the second encoder 106a discussed above. Each image frame of the second video stream is encoded into second encoded data comprising a plurality of rows. Each row has a height of a single coding unit and a width equal to a width of the image frame. Further, each row is encoded as one or more slices.

Combining S510 the first encoded data of an image frame of the first video stream and second encoded data of an image frame of the second video stream into combined encoded data. The combining S510 may be performed by the data combining unit 110 discussed above. The combining S510 being performed by interleaving rows of the first encoded data of the image frame of the first video stream and rows of the second encoded data of the image frame of the second video stream. The combined encoded data representing the combined image frame of the combined video stream.

The encoding S506, S508 may be performed in accordance with H.264, H.265 or MJPEG.

The combining S510 may be made such that a row in the combined encoded data comprises a single row of the first encoded data and a single row of the second encoded data.

The encoding S506, S508 of the image data of the first video stream and the image data of the second video stream may be performed in parallel, i.e., the encoding S506, S508 may be made at substantially the same time.

The method 500 may further comprise checking if two or more directly subsequent slices in the combined encoded data comprises only skip encoded coding units. If so the method 500 may further comprise replacing S512 the two or more directly subsequent slices comprising only skip encoded coding units with a new slice comprising only skip encoded coding units. Hence, all the coding units of the new slice are skip encoded. The new skip encoded slice may have a length of the two or more directly subsequent skip encoded slices.

The person skilled in the art realizes that the present concepts are by no means limited to the preferred embodiments described above. On the contrary, many modifications and variations are possible within the scope of the appended claims.

For example, three or more video streams captured by three or more image sensors and encoded by three or more encoders may be combined into a combined video stream using the present concepts. In case four video streams captured by four image sensors and encoded by four encoders is used, each row in the combined encoded data may comprise a single row of encoded data from each of the four video streams.

Further, the different image sensors may be arranged next to each other substantially in a same plane. However, according to some embodiments at least some of the plurality of image sensors may be arranged in an angled set-up as compared with each other. For example, one of the plurality of image sensors may be angled 90° as compared with another one of the plurality of image sensors. According to one specific embodiment, the digital video camera may comprise four image sensors arranged in a rectangular or quadratic set-up.

Additionally, variations to the disclosed embodiments can be understood and effected by the skilled person in practicing the claims, from a study of the drawings, the disclosure, and the appended claims.

The invention claimed is:

1. A digital video camera comprising:
 a first image sensor configured to capture image frames of a first video stream;
 a second image sensor configured to capture image frames of a second video stream;
 a first encoder configured to encode image data of the image frames of the first video stream, wherein each image frame of the first video stream is encoded into first encoded data comprising a plurality of rows wherein each row has a height of a single coding unit and a width equal to a width of the image frame and is encoded as one or more slices;
 a second encoder configured to encode image data of the image frames of the second video stream, wherein each image frame of the second video stream is encoded into second encoded data comprising a plurality of rows wherein each row has a height of a single coding unit and a width equal to a width of the image frame and is encoded as one or more slices;
 a data combining unit configured to combine first encoded data of an image frame of the first video stream and second encoded data of an image frame of the second video stream into combined encoded data by interleaving rows of the first encoded data of the image frame of the first video stream and rows of the second encoded data of the image frame of the second video stream, the combined encoded data representing a combined image frame of a combined video stream, wherein the data combining unit is configured to check if two or more directly subsequent slices in the combined encoded data comprises only skip encoded coding units, and if so replacing the two or more directly subsequent slices comprising only skip encoded coding units with a new slice comprising skip encoded coding units having a length of the two or more directly subsequent slices comprising only skip encoded coding units.

2. The video digital camera according to claim 1, wherein a row in the combined encoded data comprises a single row of the first encoded data and a single row of the second encoded data.

3. The digital video camera according to claim 1, wherein the first and second encoders are configured to encode image data of the first and second video streams in parallel.

4. The digital video camera according to claim 1, wherein the first and second images sensors are configured to capture the first and second video streams synchronously.

5. The digital video camera according to claim 1, wherein the data combining unit is configured to output the combined encoded data as a bit stream.

6. The digital video camera according to claim 1, wherein the first and second encoders are configured to encode image data of the first and second image frames such that each row comprises a plurality of slices, wherein each slice has a height of one single coding unit.

7. The digital video camera according to claim 1, wherein the first and second encoders are configured to encode image data of the first and second image frames such that each row constitutes a single slice.

8. The digital video camera according to claim 1, wherein the combined image frame represents a panoramic image.

9. A method for forming a combined image frame of a combined video stream, the method comprising:

capturing, by a first image sensor of a multi-sensor camera, image frames of a first video stream;

capturing, by a second image sensor of the multi-sensor camera, image frames of a second video stream;

encoding, by a first encoder of the multi-sensor camera, image data of the image frames of the first video stream, wherein each image frame of the first video stream is encoded into first encoded data comprising a plurality of rows wherein each row has a height of a single coding unit and a width equal to a width of the image frame and is encoded as one or more slices;

encoding, by a second encoder of the multi-sensor camera, image data of the image frames of the second video stream, wherein each image frame of the second video stream is encoded into second encoded data comprising a plurality of rows wherein each row has a height of a single coding unit and a width equal to a width of the image frame and is encoded as one or more slices;

combining, by a data combining unit, the first encoded data of an image frame of the first video stream and second encoded data of an image frame of the second video stream into combined encoded data by interleaving rows of the first encoded data of the image frame of the first video stream and rows of the second encoded data of the image frame of the second video stream, the combined encoded data representing the combined image frame of the combined video stream; and checking if two or more directly subsequent slices in the combined encoded data comprises only skip encoded coding units, and if so replacing the two or more directly subsequent slices comprising only skip encoded coding units with a new slice comprising skip encoded coding units and having a length of the two or more directly subsequent skip comprising only skip encoded coding units.

10. The method according to claim 9, wherein the combining is made such that a row in the combined encoded data comprises a single row of the first encoded data and a single row of the second encoded data.

11. The method according to claim 9, wherein the encoding of the image data of the first video stream and the image data of the second video stream is performed in parallel.

12. The method according to claim 9, wherein capturing of the first and second video streams are performed synchronously.

13. A non-transitory computer-readable storage medium having stored thereon instructions for implementing the method according to claim 9, when executed on a device having processing capabilities.

\* \* \* \* \*